United States Patent
Neo et al.

(10) Patent No.: US 7,213,447 B2
(45) Date of Patent: May 8, 2007

(54) METHOD AND APPARATUS FOR DETECTING TOPOGRAPHICAL FEATURES OF MICROELECTRONIC SUBSTRATES

(75) Inventors: Chee Peng Neo, Singapore (SG); Cher Khng Victor Tan, Singapore (SG); Kian Seng Ho, Singapore (SG); Hock Chuan Tan, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/157,338

(22) Filed: Jun. 20, 2005

(65) Prior Publication Data

US 2005/0229684 A1    Oct. 20, 2005

Related U.S. Application Data (62) Division of application No. 10/892,048, filed on Jul. 15, 2004, now Pat. No. 6,923,045, which is a division of application No. 09/944,247, filed on Aug. 30, 2001, now Pat. No. 6,779,386.

(30) Foreign Application Priority Data

Aug. 13, 2001    (SG)    ............................ 200104881-8

(51) Int. Cl.
*G01B 5/34* (2006.01)
*G06K 9/00* (2006.01)

(52) U.S. Cl. ..................... 73/105; 73/104; 356/600; 382/108; 382/147; 382/149; 382/150; 382/154

(58) Field of Classification Search ................ 73/104, 73/105; 356/600; 382/108, 145, 147, 149, 382/150, 154
See application file for complete search history.

(56) References Cited

U.S. PATENT DOCUMENTS 4,878,114 A    10/1989    Huynh et al.

(Continued)

FOREIGN PATENT DOCUMENTS

EP    0 898 300 A2    2/1999

(Continued)

OTHER PUBLICATIONS

Mitsubishi Materials Corporation, "Surface Roughness," 2 pages, 2000, retrieved from the Internet on Jul. 4, 2001, <http://www.mitsubishicarbide.com/english/reference/hyoumenarasa.htm>.

(Continued)

*Primary Examiner*—Daniel S. Larkin
(74) *Attorney, Agent, or Firm*—Perkins Coie LLP (57) ABSTRACT

An apparatus and method for detecting characteristics of a microelectronic substrate. The microelectronic substrate can have a first surface with first topographical features, such as roughness elements, and a second surface facing opposite from the first surface and having second topographical features, such as protruding conductive structures. In one embodiment, the apparatus can include a support member configured to carry the microelectronic substrate with a first portion of the first surface exposed and a second portion of the second surface exposed. The apparatus can further include a topographical feature detector positioned proximate to support member and aligned with the first portion of the first surface of the microelectronic substrate to detect characteristics, such as a roughness, of the first surface while the microelectronic substrate is carried by the support member.

16 Claims, 3 Drawing Sheets

U.S. PATENT DOCUMENTS

| | | | |
|---|---|---|---|
| 4,931,962 A | 6/1990 | Palleiko | |
| 5,058,178 A | 10/1991 | Ray | |
| 5,064,291 A | 11/1991 | Reiser | |
| 5,103,095 A * | 4/1992 | Elings et al. | 250/306 |
| 5,245,863 A * | 9/1993 | Kajimura et al. | 73/105 |
| 5,333,495 A * | 8/1994 | Yamaguchi et al. | 73/105 |
| 5,581,082 A | 12/1996 | Hansma et al. | |
| 5,864,054 A | 1/1999 | Smith, Jr. | |
| 5,955,661 A * | 9/1999 | Samsavar et al. | 73/105 |
| 6,241,456 B1 | 6/2001 | Kato et al. | |
| 6,267,005 B1 * | 7/2001 | Samsavar et al. | 73/105 |
| 6,389,885 B1 * | 5/2002 | Arnold et al. | 73/105 |
| 6,480,286 B1 | 11/2002 | Kubo et al. | |
| 6,779,386 B2 | 8/2004 | Neo et al. | 73/105 |
| 6,812,045 B1 | 11/2004 | Nikoonahad et al. | 438/14 |
| 2004/0253748 A1 | 12/2004 | Neo et al. | 438/14 |

FOREIGN PATENT DOCUMENTS

| | | |
|---|---|---|
| JP | 03-030352 | 2/1991 |
| JP | 04-092444 | 3/1992 |
| JP | 09-281016 | 10/1997 |

OTHER PUBLICATIONS

Written Opinion from Australian Patent Office for Singapore Application No. 200104881-8, 6 pages, Nov. 20, 2003.

Search Report from Australian Patent Office for Singapore Application No. 200104881-8, 5 pages, Nov. 20, 2003.

* cited by examiner

METHOD AND APPARATUS FOR DETECTING TOPOGRAPHICAL FEATURES OF MICROELECTRONIC SUBSTRATES

CROSS-REFERENCE TO RELATED APPLICATIONS

This application is a divisional application of U.S. patent application Ser. No. 10/892,048, entitled "METHOD AND APPARATUS FOR DETECTING TOPOGRAPHICAL FEATURES OF MICROELECTRONIC SUBSTRATES," filed Jul. 15, 2004, now U.S. Pat. No. 6,923,045, issued Aug. 2, 2005, which is a divisional application of U.S. patent application Ser. No. 09/944,247, filed Aug. 30, 2001, now U.S. Pat. No. 6,779,386, issued Aug. 24, 2004, which claims foreign priority benefits of Singapore Application No. 200104881-8, filed Aug. 13, 2001.

BACKGROUND

The present invention relates to methods and apparatuses for detecting topographical features of microelectronic substrates, for example, detecting the surface roughness of a microelectronic substrate having solder or gold bump terminals. Packaged microelectronic assemblies, such as memory chips and microprocessor chips, typically include a microelectronic substrate die encased in a plastic, ceramic, or metal protective covering. The dies are typically formed in or on a wafer, such as a silicon wafer, and can include functional devices or features, such as memory cells, processing circuits, and interconnecting wiring. Each die also typically includes bond pads or other conductive structures, such as gold bumps or solder bumps that are electrically coupled to the functional devices. The conductive structures can then be electrically coupled to pins or other types of terminals that extend outside the protective covering for connecting to buses, circuits, and/or other microelectronic assemblies.

One method for increasing the throughput of packaged microelectronic assemblies is to perform many processing operations on the dies before the dies are singulated from the wafer, a practice referred to in the industry as wafer-level packaging. One such process step includes disposing gold or solder bumps on the dies at the wafer level to form a "bumped" wafer. When performing such operations at the wafer level, it is typically important to measure the average thickness, thickness variation, and roughness of the wafer to ensure that the wafer meets tight dimensional specifications, and to ensure that any microdefects of the wafer (which can reduce wafer strength) are eliminated or reduced to acceptable levels.

Figure 1A:
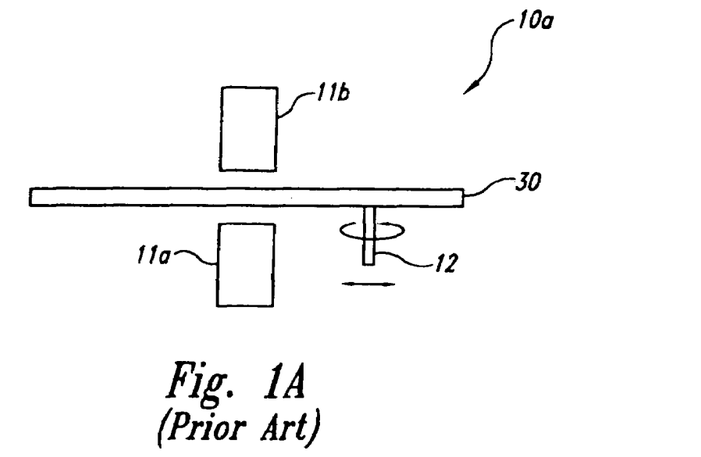
FIGS. 1A–C are side views of apparatuses in accordance with the prior art showing selected components schematically.

FIG. 1A is a schematic illustration of a conventional apparatus 10a for measuring the thickness and thickness variation of a wafer 30. Such apparatuses are available from ADE of Westwood, Mass., under model numbers 9520 and 9530. The apparatus 10a can include a narrow, rod-shaped vacuum chuck 12 that supports the wafer 30, a lower capacitance probe 11a that measures the distance to the wafer back surface, and an upper capacitance probe 11b that measures the distance to the wafer front or device-side surface. The thickness of the wafer 30 at a particular point on the wafer can be calculated by subtracting the two distance measurements from the total distance between the capacitance probes 11a and 11b. The total thickness variation (TTV) of the wafer 30 can be calculated by traversing the rotating wafer 30 in between the probes 11a and 11b, determining a maximum thickness value and a minimum thickness value, and subtracting the minimum thickness value from the maximum thickness value. The average thickness of the wafer can be calculated by taking the mean of all the thickness values collected.

Figure 1B:
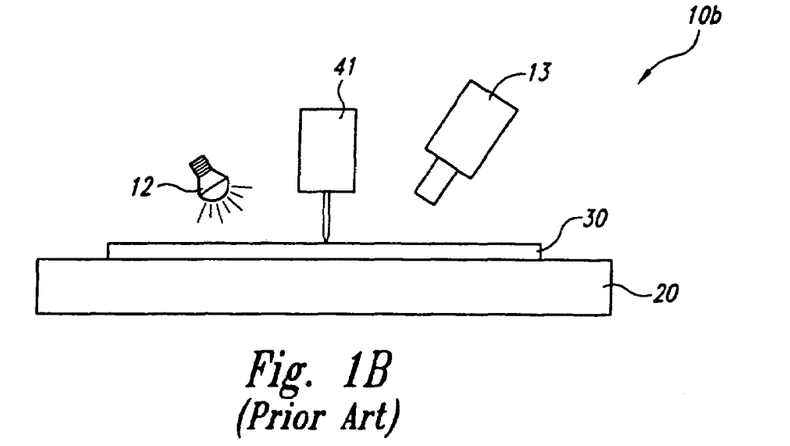

FIG. 1B is a schematic illustration of an apparatus 10b used to determine the roughness of the wafer 30. The apparatus 10b can include a support table 20 that carries the wafer 30 with the back surface of the wafer 30 facing upwardly. A stylus 41 traverses over the back surface of the wafer 30 and moves up and down as it passes over roughness features on the back surface. A light 12 illuminates the back surface of the wafer 30 for visual inspection through a microscope 13 which can be used to capture a video image that can be saved on a bitmap file for correlating with the capacitance scan data. Such apparatuses are available from Veeco-Metrology Group of Santa Barbara, Calif.

One drawback with the devices 10a and 10b described above is that they may not be suitable for detecting the characteristics of bumped wafers which have solder bumps or gold bumps that project from a surface of the wafer. For example, the apparatus 10a shown in FIG. 1A typically cannot distinguish between the surface of the wafer 30 and the elevated surface of the bumps on the wafer 30, and can accordingly produce erroneous thickness and thickness variation measurements. The capacitance probes 11a and 11b typically do not have the high resolution required to determine surface roughness. The apparatus 10b shown in FIG. 1B typically includes a vacuum system in the support table 20 to draw the wafer 30 tightly down against the table 20. When the wafer 30 includes solder bumps or gold bumps, the bumped surface of the wafer 30 may not form an adequate seal with the support table 20. Furthermore, the contact between the support table 20 and the wafer 30 can damage the bumps and render all or part of the wafer 30 inoperable.

Figure 1C:
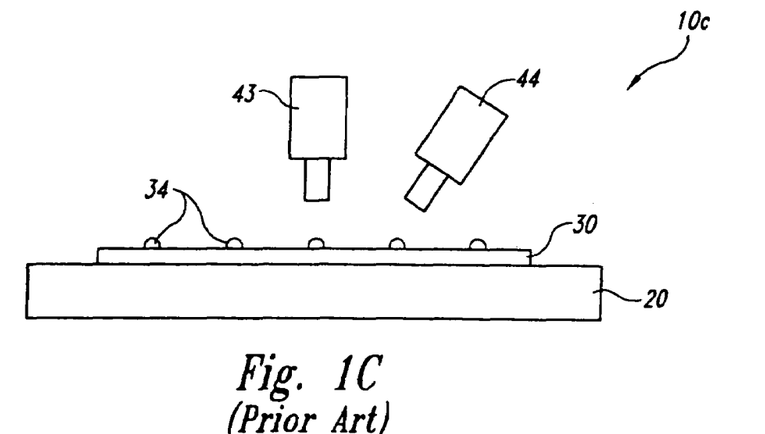

FIG. 1C illustrates a conventional apparatus 10c available from August Technology of Bloomington, Minn., and specifically configured to detect characteristics of a bumped wafer 30. The apparatus 10c can include a support table 20 having a vacuum system to draw the back surface of the wafer 30 down tightly against the support table 20, with the bumps 34 facing upwardly. A two-dimensional inspection camera 43 traverses above the device-side surface of the wafer 30 to assess the position, diameter, and/or surface characteristics of the bumps 34. A three-dimensional inspection camera 44 can traverse above the device-side surface of the wafer 30 to determine the height of the bumps 34.

One drawback with the device 10c shown in FIG. 1C is that it is not configured to determine the thickness, the total thickness variation, or the roughness of the backside of the wafer 30. Accordingly, none of the apparatuses described above with reference to FIGS. 1A–C are capable of adequately determining the characteristics of the wafer 30 typically used to assess whether the wafer 30 is ready for singulation and subsequent packaging operations.

SUMMARY

The present invention is directed toward apparatuses and methods for detecting characteristics of a microelectronic substrate having a first surface with first topographical features and a second surface facing opposite from the first surface and having second topographical features. In one aspect of the invention, the apparatus can include a support member configured to carry the microelectronic substrate with a first portion of the first surface exposed and a second portion of the second surface exposed. The apparatus can further include a topographical feature detector positioned proximate to the support member and aligned with a first portion of the first surface of the microelectronic substrate when the microelectronic substrate is carried by the support member. The topographical feature detector can include a non-capacitive detection device configured to detect roughness characteristics of the first topographical features.

In a further aspect of the invention, the apparatus can also include a second topographical feature detector positioned proximate to the support member and configured to detect a characteristic of the second topographical features. The second topographical features can include solder bumps or gold bumps, and the first topographical features can include a roughness element that is not a conductive connection structure. The second topographical feature detector can include a probe having a contact portion configured to contact the microelectronic substrate, or a radiation emitter and receiver configured to direct radiation toward the microelectronic substrate and receive reflected radiation to detect a roughness of the microelectronic substrate. The radiation emitter can be configured to emit laser radiation, and the radiation receiver can be configured to receive laser radiation.

The invention is also directed toward a method for detecting characteristics of a microelectronic substrate having a first surface with first topographical features that do not include conductive connection structures, and a second surface facing opposite from the first surface and having second topographical features. The method can include supporting the microelectronic substrate while at least a first portion of the first surface is exposed and at least a second portion of the second surface is exposed. The method can further include detecting a characteristic of the first topographical features by positioning a topographical detection device at least proximate to the first portion of the first surface and activating the topographical detection device while the first portion of the first surface and the second portion of the second surface are exposed to receive feedback from the first topographical features.

In a further aspect of the invention, the method can further include determining a thickness variation for the microelectronic substrate by establishing a reference plane, determining distances from the reference plane to a plurality of roughness features of the first surface, selecting from the determined distances a minimum distance value and a maximum distance value, and subtracting the minimum distance value from the maximum distance value. In yet a further aspect of the invention, the method for determining the thickness variation of the microelectronic substrate can be carried out on a computer.

DETAILED DESCRIPTION

The following disclosure describes methods and apparatuses for detecting topographical features of microelectronic substrates. The term "microelectronic substrate" is used throughout to include substrates upon which and/or in which microelectronic circuits or components, data storage elements or layers, and/or vias or conductive lines are or can be fabricated. Many specific details of certain embodiments of the invention are set forth in the following description and in FIGS. 2–4 to provide a thorough understanding of these embodiments. One skilled in the art, however, will understand that the present invention may have additional embodiments, and that the invention may be practiced without several of the details described below.

Figure 2:
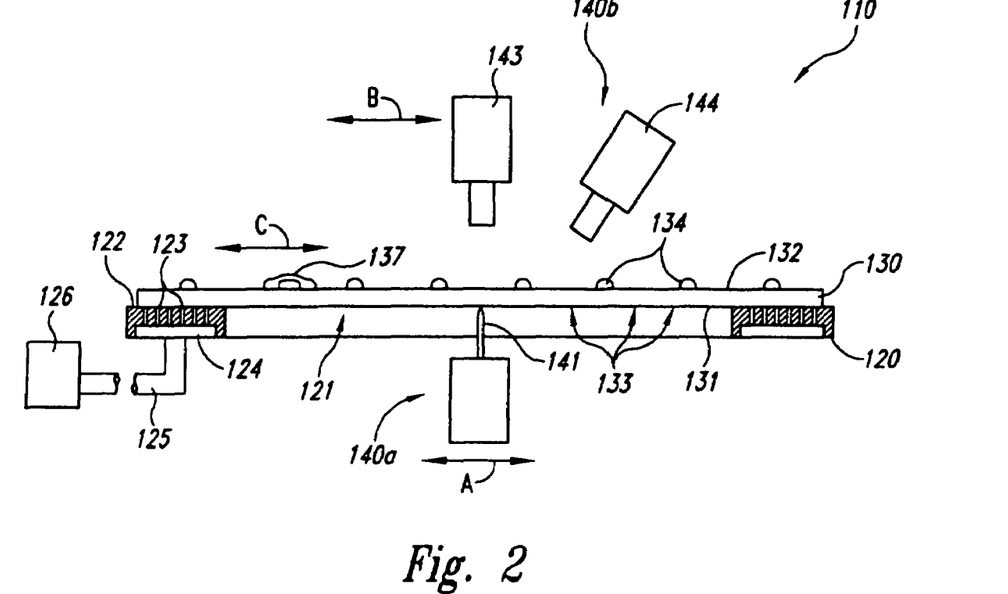
FIG. 2 is a side view of an apparatus in accordance with an embodiment of the invention showing selected components schematically.

FIG. 2 illustrates an apparatus 110 in accordance with an embodiment of the invention. In one aspect of this embodiment, the apparatus 110 can include a support member 120 that supports a microelectronic substrate 130. The microelectronic substrate 130 can have a first surface 131 with first topographical features 133 (such as roughness elements) and a second surface 132 facing opposite from the first surface 131 and having second topographical features 134. The second topographical features 134 can include solder bumps, gold bumps, or other electrical connection or termination structures that are offset from the second surface 132. The first topographical features can include roughness elements, but do not include solder bumps, gold bumps or other electrical connection or termination structures that are offset from the first surface 131. At least a portion of the first surface 131 can remain exposed for access by a first topographical feature detector 140a. At the same time, at least a portion of the second surface 132 can remain exposed for access by a second topographical feature detector 140b. Accordingly, the apparatus 110 can simultaneously detect characteristics of both the first topographical features 133 and the second topographical features 134 while the microelectronic substrate 130 is supported by the same support member 120.

In a further aspect of this embodiment, the support member 120 can have a peripheral contact surface 122 configured to contact a peripheral area of the first surface 131 of the microelectronic substrate 130 and an opening 121 under an interior portion of the first contact surface 131. The opening 121 can be an annular opening large enough to allow access to at least a representative portion of the first surface 131. The contact surface 122 can also extend radially inwardly far enough to stably support the microelectronic substrate 130 without allowing the microelectronic substrate 130 to unduly sag or warp. The size of the peripheral region of the microelectronic substrate 130 engaged by the contact surface 122 can depend on factors such as the diameter of the substrate 130 and the thickness and/or rigidity of the substrate 130. In other embodiments, the support member 120 can engage only the peripheral edge of the microelectronic substrate 130, for example, with suction devices, clamps, and/or other retention elements configured to stably support the microelectronic substrate 130 in a flat orientation.

In one aspect of an embodiment shown in FIG. 2, the support member 120 can include apertures 123 that extend through the contact surface 122. The apertures 123 can be in fluid communication with a chamber 124, and the chamber 124 can be coupled to a vacuum source 126 with a conduit 125. Accordingly, the vacuum source 126 can apply a vacuum to the vacuum apertures 123 to draw the microelectronic substrate 130 against the support member 120. The apertures 123 can also be coupled to a positive pressure source to separate the microelectronic substrate 130 from the support member 120. In other embodiments, the support member 120 can include other arrangements for securing the microelectronic substrate 130 during operation. An advantage of any of these embodiments is that the microelectronic substrate 130 can rest flat on the contact surface 122 while the topographical feature detectors 140a and 140b assess the topographical features 133 and 134, respectively.

The first topographical feature detector 140a can be positioned proximate to the exposed portion of the first surface 131, and the second topographical feature detector 140b positioned proximate to the exposed portion of the second surface 132. For example, the first topographical feature detector 140a can include a stylus or probe 141 that contacts the first surface 131 to detect differences in elevation between one first topographical feature 133 and another. Alternatively, the first topographical feature detector 140a can include other devices that also detect or assess characteristics of the first topographical features 133 (for example, by receiving feedback from the first topographical features 133), as described below with reference to FIG. 4.

The second topographical feature detector 140b can include a two-dimensional inspection camera 143 and/or a three-dimensional inspection camera 144. The two-dimensional inspection camera 143 can have a line-of-sight directed generally normal to the second surface 132 to detect the position, diameter, and/or surface features of the second topographical features 134. The surface features detected by the two-dimensional camera 143 can include the surface finish of the second topographical features 134, and/or whether adjacent topographical features 134 are inappropriately connected, for example with a solder bridge 137. The three-dimensional inspection camera 144 can have a line-of-sight directed obliquely toward the second surface 132, for example, to detect the height of the second topographical features 134 above the second surface 132. In other embodiments, the second topographical feature detector 140b can include other devices or arrangements.

In yet a further aspect of an embodiment of the apparatus 110 shown in FIG. 2, the first topographical feature detector 140a can move over the first surface 131, as indicated by arrow "A." The second topographical feature detector 140b can move over the second surface 132 as indicated by arrow "B." The movement of the first topographical feature detector 140a can be coordinated with, or independent of, the movement of the second topographical feature detector 140b. The support member 120 can move the microelectronic substrate 130 relative to the topographical feature detectors 140a and 140b (as indicated by arrow "C") either in conjunction with, or in lieu of, moving the topographical feature detectors 140a and 140b. In any of the foregoing embodiments, the relative movement between the microelectronic substrate 130 and the topographical feature detectors 140a and 140b can be sufficient to obtain at least a representative sampling of the characteristics of the first topographical features 133 and the second topographical features 134, respectively.

Figure 3A:
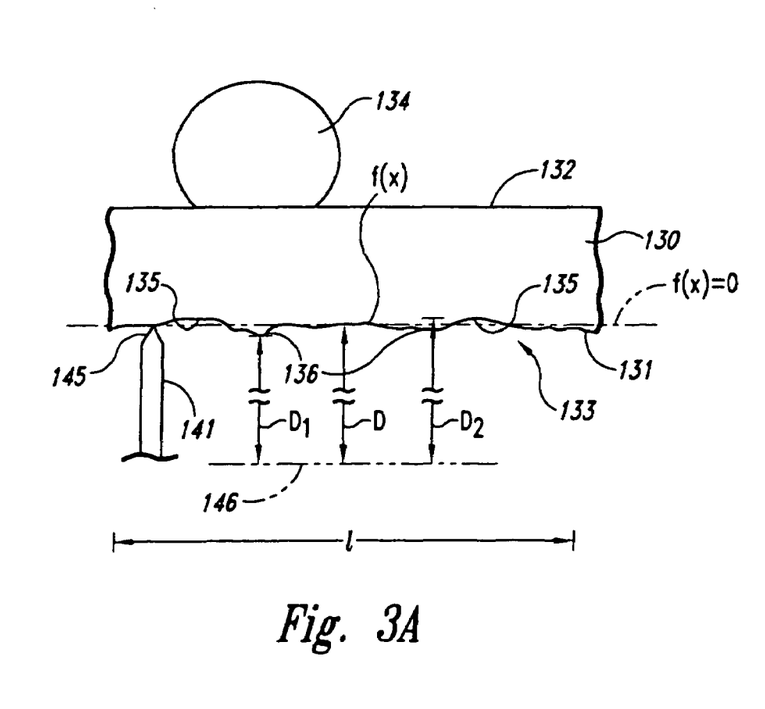
FIG. 3A is an enlarged side view of a portion of the apparatus shown in FIG. 2.

FIG. 3A is an enlarged view of a portion of the apparatus 110 and the microelectronic substrate 130 described above with reference to FIG. 2. In one aspect of the embodiment shown in FIG. 3A, the stylus 141 can include a stylus tip 145 that moves over the first surface 131 during operation. The first topographical features 133 of the first surface 131 can include a plurality of recesses 135 and projections 136. As the stylus tip 145 passes over the recesses 135 and projections 136, the first topographical feature detector 140a can detect, track and store measurements of the distance "D" between a reference plane 146 and the first surface 131. A plurality of distance measurements D can then be integrated or otherwise manipulated to define a roughness measurement of the first surface 131. For example, the calculated roughness can be an arithmetic roughness (Ra) determined by the following equation:

$$Ra = \frac{1}{l}\int_0^l \{f(x)\}dx$$

where l=representative length
f(x)=function describing surface profile, with f(x)=0 at its mean value In one embodiment, the target range for Ra can be from about thirteen microns to about seventeen microns, and in other embodiments, the target range can have other values.

In one aspect of the foregoing embodiment, the stylus tip 145 can remain in contact with the first surface 131 of the microelectronic substrate 130 as the stylus 141 and the microelectronic substrate 130 move relative to each other. Alternatively, the stylus tip 145 can disengage from the first surface 131 when the stylus 141 and/or the microelectronic substrate 130 are moved, and re-engage when a new relative position is reached. In still a further alternate arrangement, the apparatus 110 can include a plurality of styli that simultaneously make individual distance measurements, reducing or eliminating the need to move the styli or the microelectronic substrate 130.

In one embodiment, the first topographical feature detector 140a can be used to determine a thickness variation for the microelectronic substrate using the information received from the stylus 141. Accordingly, the process can include tracking a minimum distance $D_1$ (corresponding to the distance between the reference plane 146 and the highest projection 136), and a maximum distance $D_2$ (corresponding to the distance between the reference plane 146 and the deepest recess 135). Assuming the microelectronic substrate 130 is positioned flat on the support member 120 (FIG. 2) and the second surface 132 is flat, the total thickness variation (TTV) of the microelectronic substrate 130 can be computed subtracting $D_1$ from $D_2$. This method for determining TTV can be particularly useful when the processes used to form the microelectronic substrate 130 are reliable enough to produce substrates having a repeatable overall thickness value. In such instances, the apparatus 110 need only provide data on surface roughness and total thickness variation and need not detect or calculate the overall substrate thickness.

Figure 3B:
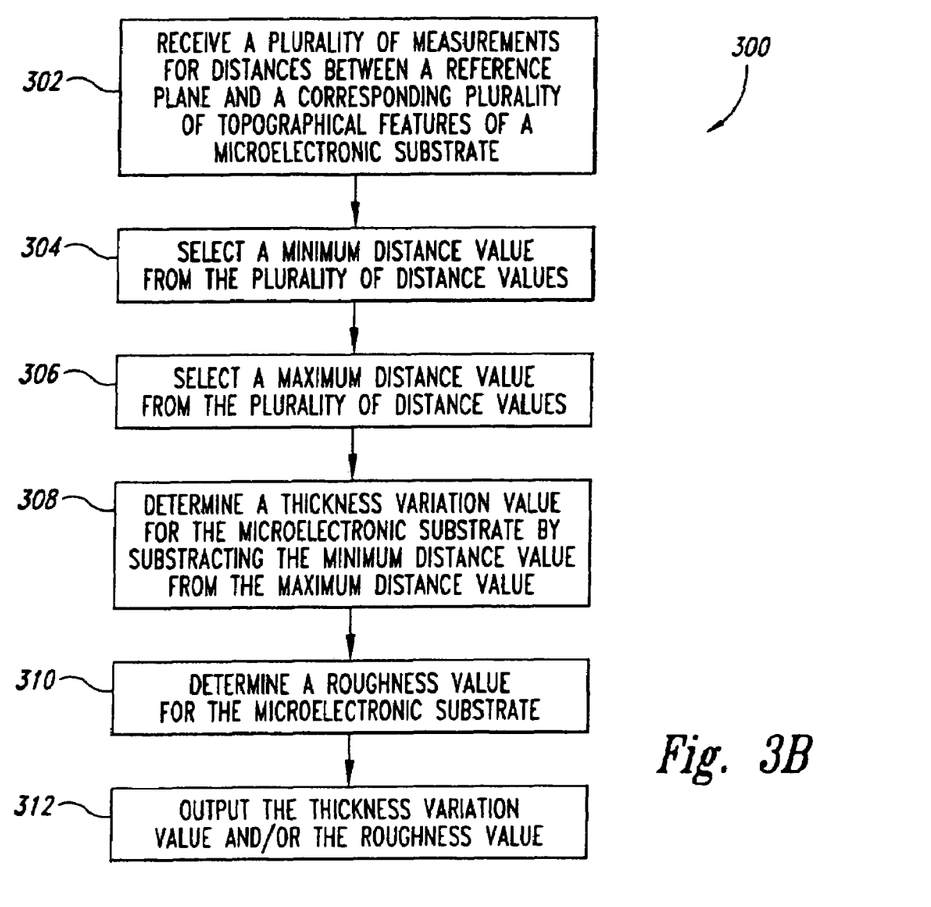
FIG. 3B is a flowchart illustrating a process for determining thickness variation for a microelectronic substrate with an embodiment of the apparatus shown in FIGS. 2 and 3A.

One or more of the foregoing process steps can be completed automatically by a computer program run on either the first topographical feature detector 140a or a computer coupled to the first topographical feature detector 140a. Referring now to FIG. 3B, the process 300 can include receiving a plurality of measurements for distances between a reference plane and a corresponding plurality of topographical features of a microelectronic substrate (step 302). The process can further include selecting a minimum distance value from the plurality of distance values (step 304) and selecting a maximum distance value from the plurality of distance values (step 306). In step 308, the process can include determining a thickness variation value for the microelectronic substrate by subtracting the minimum distance value from the maximum distance value. The process can optionally include determining a roughness value for the microelectronic substrate, for example, by using any of a variety of known summation and/or integration techniques (step 310). The thickness variation value and/or the roughness value can be output to a user in step 312, for example, via a visual digital display or a printed hard copy.

If the total thickness variation and/or roughness values determined for the first surface 131 are outside specified limits, the process used to remove material from the first surface 131 (for example, by backgrinding the first surface 131 with a Model DFG 850 backgrinder available from DISCO Corporation of Tokyo, Japan) can be modified. Accordingly, the next microelectronic substrate 130 (or batch of microelectronic substrates 130) can have the proper amount of material removed from it prior to being assessed by the apparatus 110.

One feature of the apparatus 110 described above with reference to FIGS. 2 and 3A is that the second surface 132 of the microelectronic substrate 130 is exposed while roughness and total thickness variation measurements are made on the first surface 131. Accordingly, the apparatus 110 can be less likely to damage the second topographical features 134, for example, when the second topographical features 134 include solder or gold bumps, or other protruding conductive elements.

Another advantage of this arrangement is that the apparatus 110 can simultaneously assess characteristics of the first surface 131 and the second surface 132. Accordingly, the overall time required to assess the characteristics of the microelectronic substrate 130 can be reduced because both processes can be carried out at the same time. As a result, the throughput for wafer-level packaging can be increased.

Yet another advantage of the foregoing arrangement is that the microelectronic substrate 130 can remain on the same support member 120 while both the first surface 131 and the second surface 132 are assessed. Accordingly, the microelectronic substrate 130 is less likely to become damaged as a result of moving the microelectronic substrate 130 from one support member to another.

Still another advantage of the foregoing arrangement is that the apparatus 110 can be used to monitor the quality of the backgrinding process. Accordingly, any discrepancies in the backgrinding process can be detected at an early stage and corrected by additional backgrinding and/or by adjusting the backgrinding apparatus.

Figure 4:
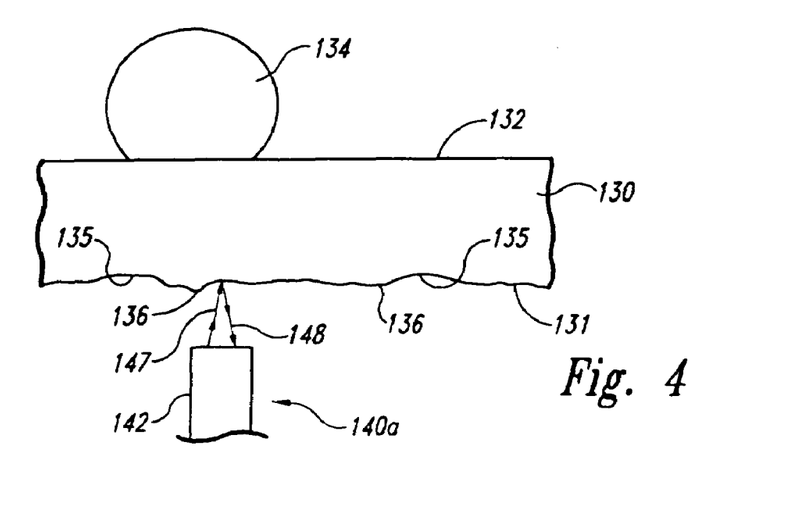
FIG. 4 is an enlarged side view of a portion of an apparatus in accordance with another embodiment of the invention showing selected components schematically.

In other embodiments, the apparatus 110 can have other arrangements. For example, as shown in FIG. 4, the first topographical feature detector 140a can include a non-contact detector 142 in addition to or in lieu of the stylus 141 described above with reference to FIGS. 2 and 3A. In a further aspect of this embodiment, the non-contact detector 142 can issue emitted or incident radiation 147 (such as a laser beam) that strikes the first surface 131 of the microelectronic substrate 130 and returns as reflected radiation 148. The reflected radiation 148 is received by a sensor of the non-contact detector 142. The radiation emitted and received by the non-contact detector 142 can include visible laser radiation in one embodiment, and can include other types of visible or non-visible radiation in other embodiments. In still a further embodiment, the non-contact detector 142 can include a receiver (such as a camera) that detects radiation emitted by a separate source (such as a light source) and reflected by the first surface 131. In any of these embodiments, the non-contact detector 142 can be configured to interpret the reflected radiation 148 (for example, by comparison to a fixed reference plane) to determine the roughness characteristics of the first surface 131 and the total thickness variation of the microelectronic substrate 130.

In one embodiment, the non-contact detector 142 can be moved relative to the microelectronic substrate 130 to scan the emitted radiation 147 over the first surface 131. Alternatively, the microelectronic substrate 130 can be moved relative to the non-contact detector 142, or both the microelectronic substrate 130 and the non-contact detector 142 can be moved relative to each other. In still a further embodiment, the non-contact detector 142 can include a stationary device that receives (and optionally issues) a broad beam of radiation to detect a representative roughness and total thickness variation of the lower surface 131 without moving the microelectronic substrate 130. An advantage of this latter arrangement is that the time to determine the characteristics of the first surface 131 can be reduced because neither the microelectronic substrate 130 nor the non-contact detector 142 need be moved relative to each other.

In still a further embodiment, the apparatus 110 can be configured to include a stylus 141 that is interchangeable with a non-contact detector 142. For example, the stylus 141 (which can be a relatively inexpensive piece of equipment) can be used to detect the surface characteristics of a relatively thick microelectronic substrate 130, which is less likely to become damaged or warped as a result of contact with the stylus 141. The non-contact detector 142 (which is a relatively more expensive piece of equipment) can be used in place of the stylus 141 to detect the surface characteristics of relatively thin microelectronic substrates 130, which are more likely to become damaged by direct contact with the stylus 141.

In other embodiments, the apparatus 110 can have other arrangements. In one such embodiment, the apparatus 110 need not include the second topographical feature detector 140b, for example, when the characteristics of the second topographical features 134 are known to an adequate degree, or when it is not necessary to determine the characteristics of the second topographical features 134, or when these characteristics can be determined from another apparatus. In still further embodiments, the support member 120 can have arrangements other than the generally ring-shaped arrangement described above with reference to FIG. 2. For example, the support member 120 can include a plurality of circumferentially spaced-apart support portions that together provide support for the microelectronic substrate 130. In yet further embodiments, the first topographical feature detector can include non-capacitive detection devices other than the stylus 141 and the radiation receiver and emitter described above, so long as the non-capacitive detection devices are configured to detect the surface roughness presented by features other than conductive terminal or connection structures (such as solder bumps or gold bumps).

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An apparatus for detecting characteristics of a microelectronic substrate having a first surface with roughness features and a second surface facing opposite from the first surface and having raised conductive features, the apparatus comprising:

a support member having a contact surface configured to contact the first surface of the microelectronic substrate, the support member being shaped to leave a first portion of the first surface exposed and a second portion of the second surface exposed when the microelectronic substrate contacts the support member;

a roughness detector that includes a probe having a contact portion positioned to contact the microelectronic substrate, the roughness detector being configured to detect a roughness of the microelectronic substrate based on measurements at a plurality of locations on the first surface of the microelectronic substrate;

an actuator coupled to at least one of the roughness detector and the support member to move at least one of the roughness detector and the support member relative to the other while the support member supports the microelectronic substrate with the probe in contact with the microelectronic substrate;

a first camera positioned proximate to the support member and configured to detect at least one of a position, a surface defect and a bridge of at least one of the raised conductive features of the microelectronic substrate when the microelectronic substrate is supported by the support member; and a second camera positioned proximate to the support member and configured to detect a height of at least one of the raised conductive features of the microelectronic substrate when the microelectronic substrate is supported by the support member.

2. The apparatus of claim 1 wherein the contact surface has apertures coupleable to a vacuum source to draw the microelectronic substrate toward the support member.

3. The apparatus of claim 1 wherein the roughness detector is configured to:
determine distances from a reference plane to a plurality of the roughness features on the first surface of the microelectronic substrate;
select from the determined distances a minimum distance value;
select from the determined distances a maximum distance value; and
subtract the minimum distance value from the maximum distance value.

4. The apparatus of claim 1 wherein the roughness detector includes a first system configured to detect roughness features of microelectronic substrates having a first range of thicknesses, interchangeable with a second system configured to detect roughness features of microelectronic substrates having a second range of thicknesses different than the first range of thicknesses.

5. The apparatus of claim 1 wherein the raised conductive features include solder bumps and/or gold bumps, and wherein the apparatus further comprises a raised feature detector positioned proximate to the support member and configured to detect a characteristic of the solder bumps and/or gold bumps.

6. The apparatus of claim 1 wherein the support member has a generally ring-shaped contact surface, and wherein the first portion of the first surface is disposed annularly inwardly from the contact surface when the support member carries the microelectronic substrate.

7. An apparatus for detecting characteristics of a microelectronic substrate having a first surface with roughness features and a second surface facing opposite from the first surface and having raised conductive features, the apparatus comprising:

a support member having a contact surface configured to contact the first surface of the microelectronic substrate, the support member being shaped to leave a first portion of the first surface exposed and a second portion of the second surface exposed when the microelectronic substrate contacts the support member;

a roughness detector that includes at least one of a probe having a contact portion positioned to contact the microelectronic substrate, and a radiation receiver positioned to receive radiation reflected from the first surface of the microelectronic substrate, the roughness detector being configured to detect a roughness of the microelectronic substrate based on measurements at a plurality of locations on the first surface of the microelectronic substrate;

an actuator coupled to at least one of the roughness detector and the support member to move at least one of the roughness detector and the support member relative to the other while the support member supports the microelectronic substrate;

a first camera positioned proximate to the support member and configured to detect at least one of a position, a surface defect and a bridge of at least one of the raised conductive features of the microelectronic substrate when the microelectronic substrate is supported by the support member; and a second camera positioned proximate to the support member and configured to detect a height of at least one of the raised conductive features of the microelectronic substrate when the microelectronic substrate is supported by the support member.

8. The apparatus of claim 7 wherein the contact surface has apertures coupleable to a vacuum source to draw the microelectronic substrate toward the support member.

9. The apparatus of claim 7 wherein the roughness detector is configured to:
determine distances from a reference plane to a plurality of the roughness features on the first surface of the microelectronic substrate;
select from the determined distances a minimum distance value;
select from the determined distances a maximum distance value; and
subtract the minimum distance value from the maximum distance value.

10. The apparatus of claim 7 wherein the roughness detector includes a first system configured to detect roughness features of microelectronic substrates having a first range of thicknesses, interchangeable with a second system configured to detect roughness features of microelectronic substrates having a second range of thicknesses different than the first range of thicknesses.

11. The apparatus of claim 7 wherein the raised conductive features include solder bumps and/or gold bumps, and wherein the apparatus further comprises a raised feature detector positioned proximate to the support member and configured to detect a characteristic of the solder bumps and/or gold bumps.

12. The apparatus of claim 7 wherein the support member has a generally ring-shaped contact surface, and wherein the first portion of the first surface is disposed annularly inwardly from the contact surface when the support member carries the microelectronic substrate.

13. The apparatus of claim 7 wherein the roughness detector includes a radiation emitter configured to emit laser radiation and wherein the radiation receiver is configured to receive the laser radiation.

14. An apparatus for detecting characteristics of a microelectronic substrate having a first surface with roughness features and a second surface facing opposite from the first surface and having raised conductive features, the apparatus comprising:

a support member having a contact surface configured to contact the first surface of the microelectronic substrate, the support member being shaped to leave a first portion of the first surface exposed and a second portion of the second surface exposed when the microelectronic substrate contacts the support member;

a roughness detector that includes at least one of a probe having a contact portion positioned to contact the microelectronic substrate, and a radiation receiver positioned to receive radiation reflected from the first surface of the microelectronic substrate, the roughness detector being configured to detect a roughness of the microelectronic substrate based on measurements at a plurality of locations on the first surface of the microelectronic substrate;

an actuator coupled to at least one of the roughness detector and the support member to move at least one of the roughness detector and the support member relative to the other while the support member supports the microelectronic substrate, wherein the roughness detector is configured to:

determine distances from a reference plane to a plurality of the roughness features on the first surface of the microelectronic substrate;

select from the determined distances a minimum distance value;

select from the determined distances a maximum distance value; and subtract the minimum distance value from the maximum distance value.

15. An apparatus for detecting characteristics of a microelectronic substrate having a first surface with roughness features and a second surface facing opposite from the first surface and having raised conductive features, the apparatus comprising:

a support member having a contact surface configured to contact the first surface of the microelectronic substrate, the support member being shaped to leave a first portion of the first surface exposed and a second portion of the second surface exposed when the microelectronic substrate contacts the support member;

a roughness detector that includes at least one of a probe having a contact portion positioned to contact the microelectronic substrate, and a radiation receiver positioned to receive radiation reflected from the first surface of the microelectronic substrate, the roughness detector being configured to detect a roughness of the microelectronic substrate based on measurements at a plurality of locations on the first surface of the microelectronic substrate;

an actuator coupled to at least one of the roughness detector and the support member to move at least one of the roughness detector and the support member relative to the other while the support member supports the microelectronic substrate, wherein the roughness detector includes a first system configured to detect roughness features of microelectronic substrates having a first range of thicknesses, interchangeable with a second system configured to detect roughness features of microelectronic substrates having a second range of thicknesses different than the first range of thicknesses.

16. An apparatus for detecting characteristics of a microelectronic substrate having a first surface with roughness features and a second surface facing opposite from the first surface and having raised conductive features, the apparatus comprising:

a support member having a contact surface configured to contact the first surface of the microelectronic substrate, the support member being shaped to leave a first portion of the first surface exposed and a second portion of the second surface exposed when the microelectronic substrate contacts the support member;

a roughness detector that includes at least one of a probe having a contact portion positioned to contact the microelectronic substrate, and a radiation receiver positioned to receive radiation reflected from the first surface of the microelectronic substrate, the roughness detector being configured to detect a roughness of the microelectronic substrate based on measurements at a plurality of locations on the first surface of the microelectronic substrate;

an actuator coupled to at least one of the roughness detector and the support member to move at least one of the roughness detector and the support member relative to the other while the support member supports the microelectronic substrate, wherein the raised conductive features include solder bumps and/or gold bumps, and wherein the apparatus further comprises a raised feature detector positioned proximate to the support member and configured to detect a characteristic of the solder bumps and/or gold bumps.

* * * * *